(12) United States Patent
Dempsey et al.

(10) Patent No.: US 6,409,148 B1
(45) Date of Patent: Jun. 25, 2002

(54) COMPOSITE HANDLE ADAPTER

(75) Inventors: James F. Dempsey, North Olmsted; John C. Holzheimer, Burton; Matt R. Kesti, Cleveland, all of OH (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 09/642,605

(22) Filed: Aug. 22, 2000

(51) Int. Cl.[7] ............................................... F16K 31/60
(52) U.S. Cl. .................. 251/288; 251/368; 137/625.17; 4/677
(58) Field of Search .............................. 251/284, 286, 251/288, 368; 4/675, 676, 677, 678; 137/625.17

(56) References Cited

U.S. PATENT DOCUMENTS

| | | | |
|---|---|---|---|
| 1,654,550 A | | 1/1928 | Muend |
| 3,397,863 A | * | 8/1968 | Bell ........................... 251/285 |
| 3,964,514 A | * | 6/1976 | Manoogian et al. ... 137/625.17 |
| 3,991,427 A | | 11/1976 | Kemker |
| 4,362,186 A | | 12/1982 | Parkison et al. |
| 4,662,389 A | | 5/1987 | Igbal |
| 4,678,002 A | | 7/1987 | Valley |
| 4,739,788 A | | 4/1988 | Reback |
| 4,813,455 A | * | 3/1989 | Iqbal ..................... 137/625.17 |
| 4,842,009 A | | 6/1989 | Reback |
| 4,979,538 A | | 12/1990 | Krippendorf et al. |
| 4,989,633 A | | 2/1991 | Humpert et al. |
| 5,048,792 A | * | 9/1991 | Fischer ................... 251/288 X |
| 5,135,022 A | | 8/1992 | Kovey et al. |
| 5,657,791 A | | 8/1997 | Graber |
| 5,960,490 A | | 10/1999 | Pitsch |
| 5,979,489 A | | 11/1999 | Pitsch |
| 6,023,796 A | | 2/2000 | Pitsch |
| 6,035,463 A | | 3/2000 | Pawelzik et al. |
| 6,125,875 A | * | 10/2000 | Dempsey et al. ........... 137/217 |

* cited by examiner

*Primary Examiner*—Kenneth Bomberg
*Assistant Examiner*—Eric Keasel
(74) *Attorney, Agent, or Firm*—Cook, Alex, McFarron, Manzo, Cummings & Mehler, Ltd.

(57) ABSTRACT

The combination of a shower valve having a metallic movable stem to control operation of the valve and a non-metallic high strength composite handle adapter secured to the stem for movement therewith, with the non-metallic handle adapter preventing galvanic corrosion between the metallic valve stem and a metallic handle attached to the handle adapter.

9 Claims, 1 Drawing Sheet

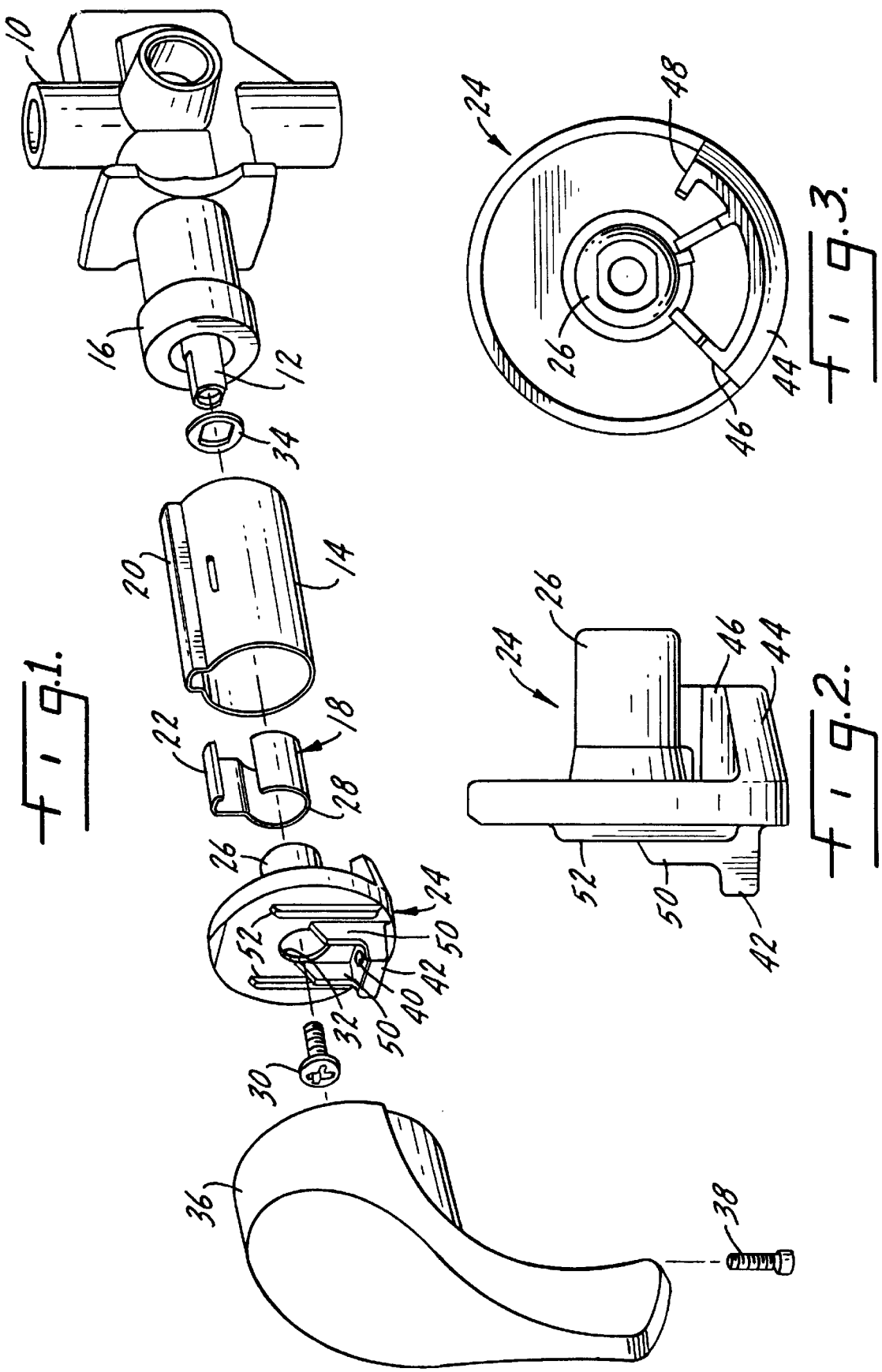

COMPOSITE HANDLE ADAPTER

THE FIELD OF THE INVENTION

The present invention relates to shower valves and more specifically to the interface between a zinc die cast shower handle and the brass cartridge stem which forms a part of the shower valve. Typically, shower handle adapters in use today are made from zinc and they will mount a zinc die cast handle to a brass cartridge stem. There is galvanic corrosion between these metallic elements, which corrosion makes it extremely difficult to remove the handle adapter and the handle when it is necessary to service the shower valve cartridge in the field. The present invention provides a handle adapter which is made of a high strength composite material which will prevent galvanic corrosion between the zinc or metallic handle and the brass valve stem.

SUMMARY OF THE INVENTION

The present invention relates to shower valves and more specifically to the use of a non-metallic high strength composite material as the adapter mounted between a metal shower handle and the metal cartridge valve stem.

A primary purpose of the invention is a shower valve installation which will utilize a non-metallic high strength composite handle adapter to prevent galvanic corrosion between the handle and the cartridge stem.

Another purpose is to provide a handle adapter which may be molded in a multicavity injection mold, thus increasing cost effectiveness in the production of shower valve components.

Another purpose is to provide a non-metallic handle adapter which will prevent galvanic corrosion between adjoining metallic components in a shower valve installation.

Other purposes will appear in the ensuing specification, drawings and claims.

BRIEF DESCRIPTION OF THE DRAWINGS

The invention is illustrated diagrammatically in the following drawings wherein:

FIG. 1 is an exploded perspective of the components in a shower valve installation;

FIG. 2 is a side view of the handle adapter; and

FIG. 3 is a rear view of the handle adapter.

DESCRIPTION OF THE PREFERRED EMBODIMENT

The present invention is specifically directed to preventing galvanic corrosion between joined metallic components in a shower valve installation, and more particularly, the zinc die cast handle and the brass cartridge stem forming a part of the shower valve. The invention provides a high strength composite handle adapter interfaced between the handle and the cartridge stem which acts as a galvanic corrosion barrier. Preferably, the handle adapter will be made of a glass fiber reinforced nylon material, and more specifically, the product known as Hiloy 610 sold by A. Schulman Company. Other materials may well be satisfactory, however, this specific material has been found to be acceptable in use.

In FIG. 1 a shower valve installation includes a valve 10 which may have located therein a mixing valve cartridge of the type manufactured by Moen Incorporated, assignee of the present application, and sold under the trademarks "1225" and "1200." Other forms of shower valves are also suitable. All such valves normally have a valve stem 12 which is formed of brass or a similar metallic material. Adjacent the valve 10 is a stop tube 14 which will extend over the portion of the valve 10, indicated at 16, which mounts the valve cartridge. Coaxially aligned with and positioned inside of the stop tube is a brake 18. Stop tubes of the type shown herein are disclosed in U.S. Pat. No. 4,813,455, also assigned to the assignee of the present application, and the disclosure of the '455 patent is herein incorporated by reference. The stop tube 14 has an axially extending rectangular projection 20, and similarly, the brake 18 has a partial axially extending projection 22 which will interlock with the projection 20, rendering the brake stationary relative to the stop tube during operation of the valve.

The handle adapter is indicated generally at 24 and may be formed of a composite material as described and has an axially extending boss 26 which will fit within the cylindrical portion 28 of the brake 18 and there will be frictional resistance between these two elements as the handle adapter is rotated, the frictional resistance providing a braking force to assist in controlling handle rotation during operation of the shower valve. A fastener 30 extends through a central opening 32 in the handle adapter 24 and will be threaded into the threaded bore of the brass cartridge stem 12 to thereby attach the handle adapter, brake, stop tube and a washer 34 into an assembly mounted on the cartridge valve stem.

The shower lever handle is indicated at 36 and may be of any suitable design. It will be attached by a fastener 38 to the handle adapter by means of a threaded bore 40 located in a platform 42 which is on the handle side of the adapter 24.

The handle adapter has the described boss 26 which extends within the brake 18 and further has an arcuate temperature stop indicated at 44 with stop surfaces 46 and 48 at the opposite ends of the arcuate projection. The stop surfaces 46 and 48 will be moved with the handle 36 during use until one or the other contacts the axial projection 20 of the stop tube 14. Thus, the stop tube and the temperature stops on the handle adapter limit rotation of the handle adapter, the lever and thus the cartridge stem 12 of the shower valve. This controls water temperature.

On the lever side of the handle adapter there is the described platform 40 with its two upstanding walls 50, which provide strength for the threaded attachment between the lever and the handle adapter. There are also upstanding ribs 52 on each side of the platform 42 which provide structural reinforcement and integrity to the handle adapter.

Of importance in the invention is the use of a non-metallic material between two metallic elements, for example, a brass valve cartridge stem and a zinc lever. Prior art metal handle adapters were subject to galvanic corrosion, making it difficult to remove the components necessary to service the valve cartridge. The composite material is high strength so that it will withstand the torsional stress normally present in operation of a shower valve. Further, the handle adapter provides temperature limit stops which cooperate with the stop tube to limit rotation of the mixing valve within the valve member 10.

The composite handle adapter is readily molded in a multi-cavity injection molding process which provides substantial cost savings over the prior art metallic handle adapters.

Whereas the preferred form of the invention has been shown and described herein, it should be realized that there may be many modifications, substitutions and alterations thereto.

The embodiments of the invention in which an exclusive property or privilege is claimed are defined as follows:

1. In combination, a shower valve having a metallic movable stem to control operation of the valve, a non-metallic, high strength, composite handle adapter secured to the stem for movement therewith, a metallic handle secured to the non-metallic handle adapter, said non-metallic handle adapter including a generally cylindrical body and an axially extending boss, with the body facing and being mounted to the metallic handle and the boss extending coaxially about the valve stem, movement of the handle concurrently moving the non-metallic handle adapter and metallic valve stem, the non-metallic handle adapter preventing galvanic corrosion between the metallic handle and the metallic valve stem.

2. The combination of claim 1 wherein the handle adapter is attached to the valve stem by a threaded element.

3. The combination of claim 1 wherein the handle is attached to the handle adapter by a threaded element.

4. The combination of claim 1 wherein said body includes a platform extending toward the handle, and a threaded element passing through the handle and into the handle adapter platform to secure the handle to the adapter.

5. The combination of claim 1 wherein the handle adapter is formed of glass fiber reinforced nylon.

6. The combination of claim 1 further including a stop tube mounted on said valve and having an axial projection, said handle adapter having an arcuate stop which cooperates with said axial projection to limit rotation of said handle.

7. The combination of claim 6 further including a brake located between said handle adapter and stop tube.

8. The combination of claim 7 wherein said handle adapter boss is located within said brake, with frictional resistance therebetween braking handle movement.

9. The combination of claim 8 wherein said brake has a cylindrical portion extending about said boss and an axial extension located within said stop tube axial projection.

* * * * *